US010097707B2

(12) United States Patent
Koike

(10) Patent No.: US 10,097,707 B2
(45) Date of Patent: Oct. 9, 2018

(54) INFORMATION PROCESSING APPARATUS CAPABLE OF DISPLAYING A SCREEN FOR VERIFICATION OF REBOOTING NECESSITY AT THE TIME OF SETTING CHANGE AND METHOD FOR CONTROLLING THE SAME

(71) Applicant: CANON KABUSHIKI KAISHA, Tokyo (JP)

(72) Inventor: Hiroaki Koike, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/187,505

(22) Filed: Jun. 20, 2016

(65) Prior Publication Data

US 2016/0301818 A1    Oct. 13, 2016

Related U.S. Application Data

(63) Continuation of application No. 14/629,414, filed on Feb. 23, 2015, now Pat. No. 9,398,181.

(30) Foreign Application Priority Data

Feb. 25, 2014  (JP) .................. 2014-033822

(51) Int. Cl.
  *H04N 1/60*    (2006.01)
  *H04N 1/00*    (2006.01)
(52) U.S. Cl.
  CPC ....... *H04N 1/00477* (2013.01); *H04N 1/0049* (2013.01); *H04N 1/00076* (2013.01); *H04N 1/00509* (2013.01); *H04N 2201/0094* (2013.01)

(58) Field of Classification Search
  None
  See application file for complete search history.

(56) References Cited

U.S. PATENT DOCUMENTS

| | | | | |
|---|---|---|---|---|
| 8,706,848 | B2* | 4/2014 | Shouno | H04L 29/12528 709/220 |
| 9,032,534 | B2* | 5/2015 | Koga | H04B 1/00 380/270 |
| 9,077,829 | B2* | 7/2015 | Ito | H04N 1/00344 |
| 2003/0231338 | A1* | 12/2003 | Haga | H04L 12/58 358/1.15 |
| 2006/0212554 | A1* | 9/2006 | Shouno | H04L 29/12528 709/221 |
| 2008/0082462 | A1* | 4/2008 | Kamata | G06Q 10/10 705/408 |

(Continued)

FOREIGN PATENT DOCUMENTS

| | | |
|---|---|---|
| CN | 101038533 A | 9/2007 |
| CN | 101206557 A | 6/2008 |

(Continued)

*Primary Examiner* — Dung D Tran
(74) *Attorney, Agent, or Firm* — Canon USA, Inc. I.P. Division

(57) ABSTRACT

An information processing apparatus includes a setting unit configured to set a setting of the information processing apparatus, a status display unit configured to display a message indicating a status of the information processing apparatus, and a display control unit configured to display, in a case where a setting changed by the setting unit is in an unreflected state, a message indicating that the setting is an unreflected setting on the status display unit.

8 Claims, 18 Drawing Sheets

(56) References Cited

U.S. PATENT DOCUMENTS

| | | | | |
|---|---|---|---|---|
| 2009/0015867 A1* | 1/2009 | Ukegawa | ............... | G06F 8/65 |
| | | | | 358/1.16 |
| 2009/0237725 A1* | 9/2009 | Hamaguchi | ........ | H04N 1/00222 |
| | | | | 358/1.15 |
| 2014/0176979 A1* | 6/2014 | Ito | .................. | H04N 1/00344 |
| | | | | 358/1.13 |
| 2015/0062606 A1* | 3/2015 | Suzuki | ............... | G06F 3/1204 |
| | | | | 358/1.13 |
| 2015/0153969 A1* | 6/2015 | Okayama | ............ | G06F 3/1204 |
| | | | | 358/1.15 |
| 2015/0242721 A1* | 8/2015 | Hayami | ............ | G06K 15/4045 |
| | | | | 358/1.15 |
| 2015/0355916 A1* | 12/2015 | Inoue | ............... | G06F 9/44505 |
| | | | | 713/100 |

FOREIGN PATENT DOCUMENTS

| | | | |
|---|---|---|---|
| CN | 101315597 | A | 12/2008 |
| CN | 101901117 | A | 12/2010 |
| CN | 102843485 | A | 12/2012 |
| JP | 2007-214853 | A | 8/2007 |
| JP | 2011-071733 | A | 4/2011 |
| JP | 2013-129119 | A | 7/2013 |
| JP | 2013-239098 | A | 11/2013 |

\* cited by examiner

BEFORE SETTING IS REFLECTED

AFTER SETTING IS REFLECTED

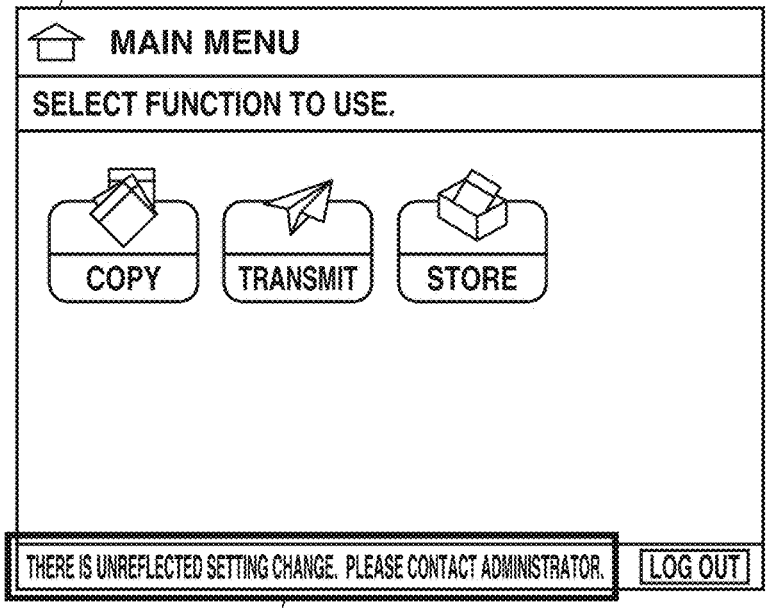
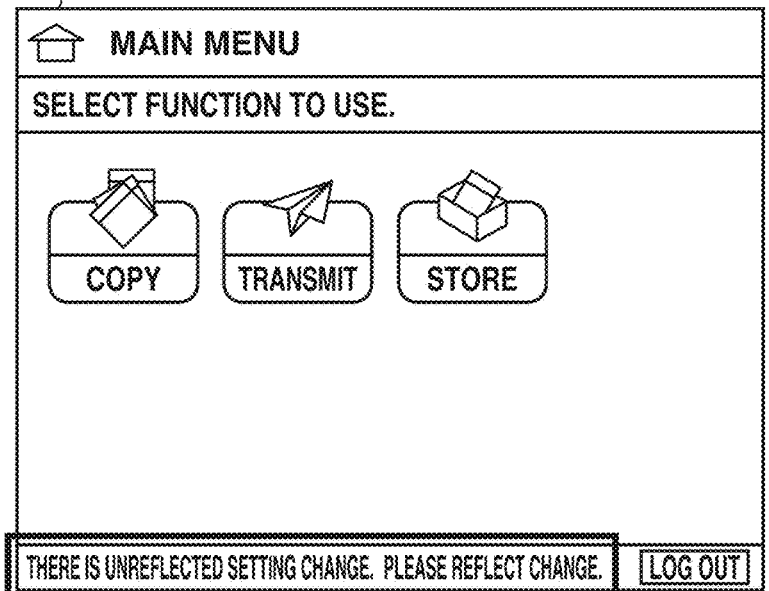

SCREEN USED TO CHANGE BOX RELATED SETTING

BOX SCREEN      COPY SCREEN

CORRESPONDING MESSAGE IS NOT DISPLAYED

```
📠 SCAN AND STORE
┌─────────────────────────────────────────────┐
│ DESIGNATE STORAGE LOCATION.                 │
├─────────────────────────────────────────────┤
│ 📦 BOX                                       │
│  ┌─────────────────────────────────────────┐│
│  │ TYPE  NAME         PAPER SIZE  PAGE  DATE/TIME │
│  │  📄  20121005141953   A3  🗋    1    10/05 14:19 │
│  │  📄  20121005144339   A5  🗋    1    10/05 14:43 │
│  │  📄  20121005141932   A4  🗋    1    11/14 08:30 │
│  │  📄  20121005101343   A4  🗋    5    11/15 10:13 │
│  │  📄  20121005101903   MIX       2    02/28 14:41 │
│  └─────────────────────────────────────────┘│
│  [ UP ][ UPDATE ]                            │
│                                              │
│  ☐ SELECT ALL                   [PRINT LIST] │
│    (UP TO 100 FILES)                         │
│                                [READ DOCUMENT ▶]│
├─────────────────────────────────────────────┤
│ THERE IS UNREFLECTED SETTING CHANGE.         │
└─────────────────────────────────────────────┘
```
～1004

～1005

CORRESPONDING MESSAGE IS DISPLAYED

1006

```
FUNCTION FLAG

COPY: 0
BOX: 1
TRANSMIT: 0
```

~1401

SCREEN THAT DISPLAYS FUNCTION
(BOX FUNCTION) FREQUENTLY USED BY USER "A"

1402

USER A: BOX
USER B: COPY
USER C: TRANSMIT

SCREEN USED TO CHANGE BOX RELATED SETTING

STATUS IS DISPLAYED

SETTING/REGISTRATION

<COMMUNICATION SETTING>

☐ SMTP RECEPTION [ON] [OFF]   ☐ POP [ON] [OFF]

| SMTP SERVER ► | |
| EMAIL ADDRESS ► | |
| POP SERVER ► | |
| POP LOGIN NAME ► | |
| POP PASSWORD ► | |

► AUTHENTICATION/ ENCRYPTION SETTING

☐ POP ISSUE INTERVAL (0 = NONE/1~99)   [0] MINUTE(S) [−] [+]

[CANCEL]   [OK]

[LOGOUT]

SCREEN USED TO CHANGE TRANSMISSION SETTING

⬇

*1406*

COPY

READY TO COPY.

| AUTOMATIC (COLOR/MONOCHROME) | 100% | AUTOMATIC PAPER | 1 | SETTING CHECK |

| COLOR SELECTION ► | SAME SIZE | ZOOM RATIO | PAPER SELECTION ► | SETTING HISTORY ► | FREQUENTLY USED SETTING ► |

FINISHING ►   TWO-SIDED ►   DENSITY ►   TEXT DOCUMENT TYPE ►

INTERRUPT   OTHER FUNCTIONS ►

*1410*

STATUS IS NOT DISPLAYED

INFORMATION PROCESSING APPARATUS CAPABLE OF DISPLAYING A SCREEN FOR VERIFICATION OF REBOOTING NECESSITY AT THE TIME OF SETTING CHANGE AND METHOD FOR CONTROLLING THE SAME

CROSS REFERENCE OF RELATED APPLICATIONS

This application is a continuation of U.S. application Ser. No. 14/629,414 filed Feb. 23, 2015 which claims priority from Japanese Patent Application No. 2014-033822 filed Feb. 25, 2014, each of which is hereby incorporated by reference herein in its entirety.

BACKGROUND OF THE INVENTION

Field of the Invention

The present invention relates to control for notifying a user that a changed setting in an information processing apparatus, such as an image processing apparatus, has not been reflected yet.

Description of the Related Art

In some devices which allows users to change each setting, in a case where the user changes a setting of an item that requires a reboot of the device to reflect the setting change, the device generally notifies the user of the necessity of rebooting the device by displaying a message prompting the user to reboot on a setting screen. Accordingly, the user reboots the device, so that the setting change is reflected.

Further, in a case where the user changes a setting of an item that may cause an inconsistency between the changed item and other items if the setting change is immediately reflected, the setting change is not reflected immediately after the user changed the setting. After settings for all of the related items are changed, these setting changes are collectively reflected by a reboot of the device or the like.

Japanese Patent Application Laid-Open No. 2007-257580 discusses a method for issuing a reboot execution instruction to a device. In a case where the device has been performing processing, such as an automatic adjustment, reboot processing is executed after the processing is finished.

However, according to such a conventional technique, when a user changes a setting of the device, the user has to consider whether a reboot of the device is necessary at the setting change operation. Further, after a change in the setting of the device that requires a reboot of the device, the user may leave the device without executing a reboot. In such a case, a next user cannot determine whether the change in the setting of the device remains unreflected. Furthermore, checking later of whether the setting changed by the user himself would have required a reboot of the device consumes time and labor of the user.

SUMMARY OF THE INVENTION

The present invention is directed to a configuration for enabling a user to determine whether there is an unreflected setting change, if a setting changed by the user has not been reflected yet. Such a configuration prevents the user from leaving a setting change unreflected.

According to an aspect of the present invention, an information processing apparatus includes a setting unit configured to set a setting of the information processing apparatus, a status display unit configured to display a message indicating a status of the information processing apparatus, and a display control unit configured to display, in a case where a setting changed by the setting unit is in an unreflected state, a message indicating that the setting is an unreflected setting on the status display unit.

Further features of the present invention will become apparent from the following description of exemplary embodiments with reference to the attached drawings.

BRIEF DESCRIPTION OF THE DRAWINGS

FIGS. 8A and 8B are diagrams each illustrating an example of an operation screen displayed on an operation unit according to the third exemplary embodiment.

FIGS. 14A, 14B, and 14C are diagrams each illustrating an example of an operation screen displayed on an operation unit according to the sixth exemplary embodiment.

DESCRIPTION OF THE EMBODIMENTS

Exemplary embodiments of the present invention are described in detail below. It is to be understood that the following exemplary embodiments are not intended to limit the claims of the present invention, and that not all of the combinations of the aspects that are described according to the following embodiments are necessarily required with respect to solving the problems according to the present invention. In each of the following exemplary embodiments of the present invention, a multifunction peripheral (MFP) is described as an example of an image processing apparatus. However, the exemplary embodiments of the present invention are not limited to the MFP.

Figure 1:
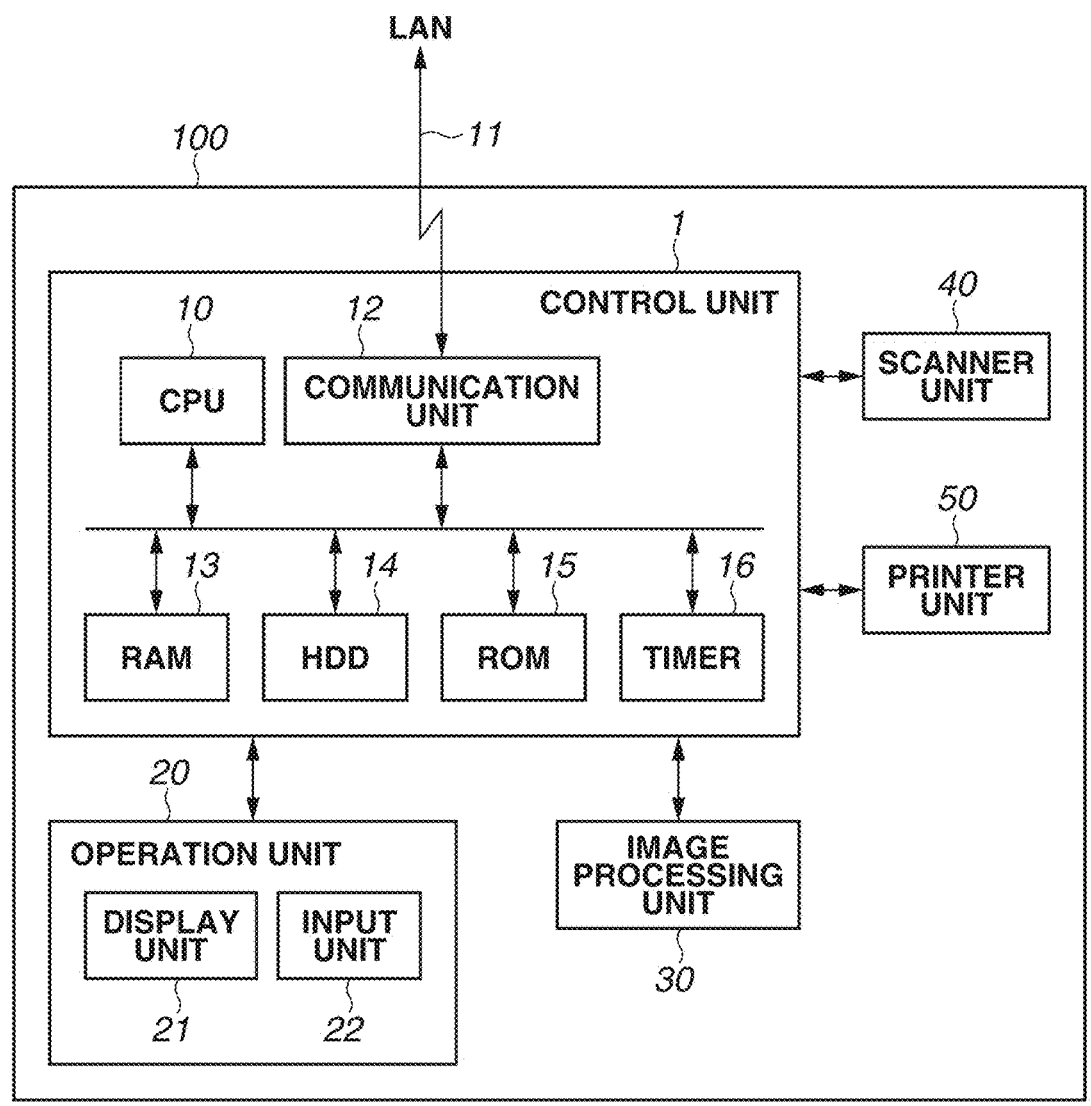
FIG. 1 is a block diagram illustrating an example of a configuration of an image processing apparatus according to an exemplary embodiment of the present invention.

FIG. 1 is a block diagram illustrating an example of a configuration of an image processing apparatus as an information processing apparatus according to an exemplary embodiment of the present invention.

An MFP 100 illustrated in FIG. 1 is the image processing apparatus according to the present exemplary embodiment of the present invention.

A control unit 1 controls an operation of each unit of the MFP 100. The control unit 1 includes a central processing unit (CPU) 10, a local area network (LAN) 11, a communication unit 12, a random access memory (RAM) 13, a hard disk drive (HDD) 14, a read only memory (ROM) 15, and a timer 16. The CPU 10 controls entirety of the control unit 1.

The LAN 11 is a network for exchanging data with an external device. The MFP 100 is connected to the Internet via the LAN 11. The communication unit 12 transmits and receives data via the LAN 11.

The RAM 13 provides a system work memory which is for the CPU 10 to operate. The HDD 14 may be a storage medium, such as a magnetic disk, an optical media, and a flash memory. The HDD 14 can store, for example, document data and setting data. The HDD 14 may not necessarily be arranged inside the MFP 100. The MFP 100 may use an external server or a HDD of a personal computer (PC) and the like as a storage device via the communication unit 12.

The ROM 15 is a boot ROM, and stores a system boot program. With the boot ROM of the ROM 15, the CPU 10 loads a program installed in the HDD 14 to the RAM 13, thereby performing various controls based on the program. The timer 16 measures time according to an instruction from the CPU 10. When designated time elapses, the timer 16 informs the CPU 10 by interrupting or the like.

An operation unit 20 is controlled by the control unit 1. The operation unit 20 includes a display unit 21 and an input unit 22. The display unit 21 displays information of the MFP 100 to a user. The input unit 22 receives an input from the user via an interface, such as a touch panel, a mouse, a camera, an audio input unit, a keyboard, and the like. The control unit 1 controls display of a message in a status display area arranged on an operation screen displayed on the display unit 21. Such a display control operation will be described in detail below.

The MFP 100 further includes an image processing unit 30, a scanner unit 40 which is an image input device, and a printer unit 50 which is an image output device. Each of the image processing unit 30, the scanner unit 40, and the printer unit 50 is controlled by the control unit 1.

Figure 2:
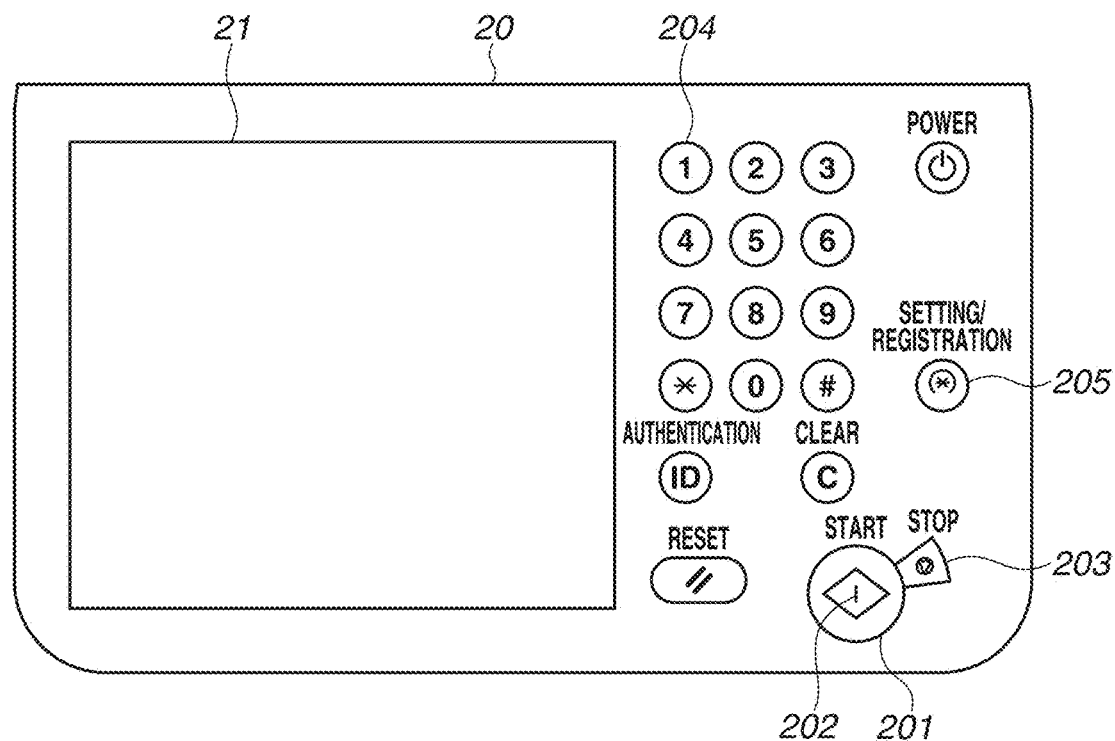
FIG. 2 is a schematic diagram illustrating an example of an operation unit.

FIG. 2 is a schematic diagram illustrating an example of the operation unit 20.

The display unit 21 is a liquid crystal display unit according to the present exemplary embodiment. The display unit 21 includes a liquid crystal display on which a touch panel sheet is attached. The display unit 21 displays an operation screen and soft keys. When a displayed key is pressed, the display unit 21 notifies the CPU 10 of location information of the pressed key. In such a case, the display unit 21 can function as the input unit 22.

The operation unit 20 includes various keys and buttons that are operated by the user. Such keys and buttons are described below.

A start key 201 is used, for example, when the user instructs the MFP 100 to start reading a document. The start key 201 includes light emitting diodes (LEDs) 202 in a middle portion thereof. The LEDs 202 emit green light and red light. These two colors of the light indicate whether the start key 201 is usable. A stop key 203 is used to stop an operation being executed. A numeric keypad 204 includes number buttons and letter buttons. The user uses the numeric keypad 204 to, for example, set the number of copies, and issue a screen switch instruction to the display unit 21. A setting/registration key 205 is pressed when the user sets a device setting.

The MFP 100 can store image data of a document in the HDD 14 by using one or more methods. The MFP 100 can read a document on a document positioning plate or an automatic document feeder (ADF) by using the scanner unit 40 to digitize the read document, thereby generating image data of the document. In addition, the MFP 100 can duplicate or move image data with an optional server via the communication unit 12. In the MFP 100, a storage medium, such as a portable medium, can be attached to an interface (not illustrated). This enables the MFP 100 to duplicate or move image data from the attached storage medium to the HDD 14.

Operations of the MFP 100 according to a first exemplary embodiment of the present invention are described below with reference to FIGS. 15, 3, and 4.

Figure 15:
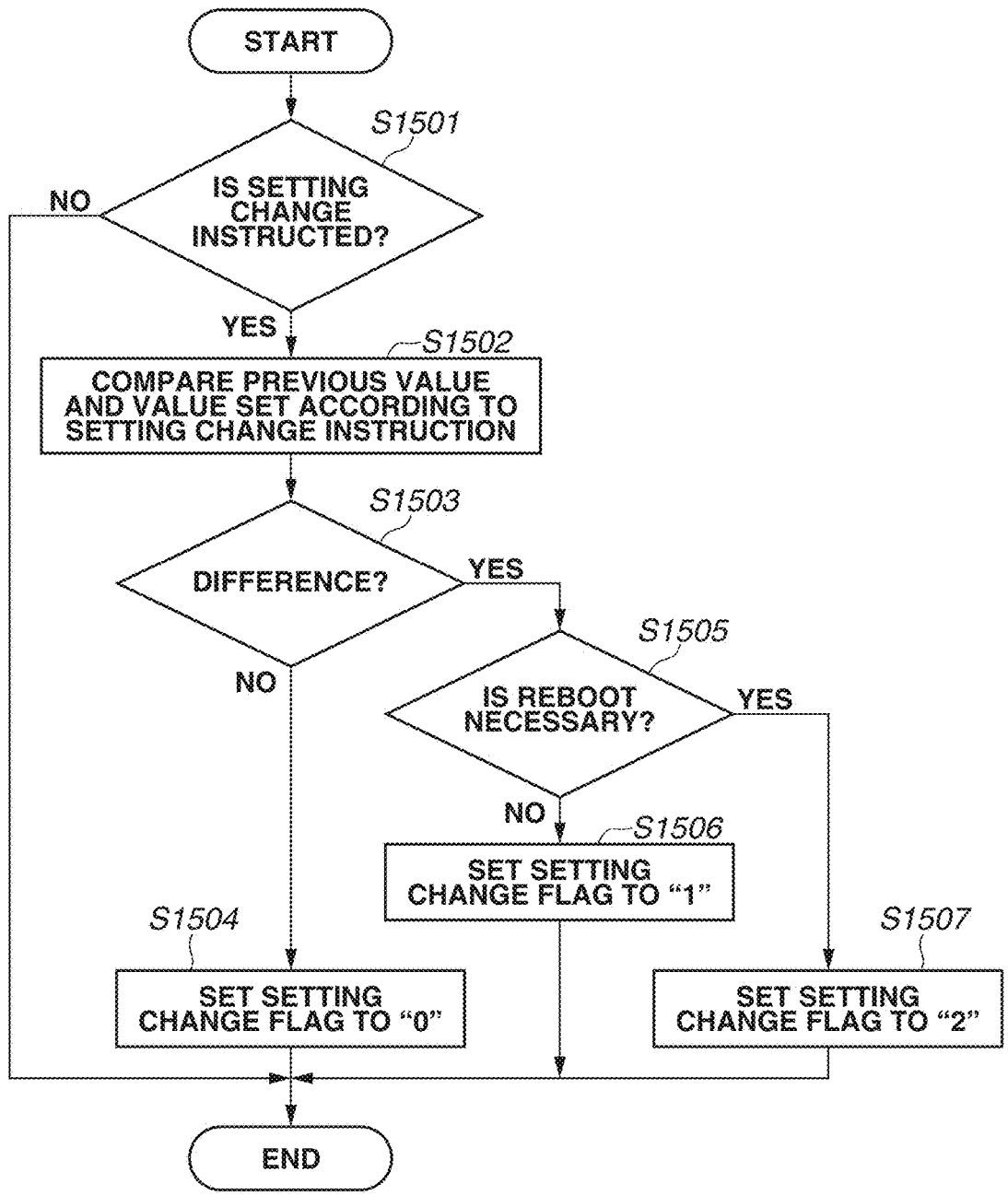
FIG. 15 is a flowchart illustrating an example of processing according to the first exemplary embodiment.

FIG. 15 is a flowchart illustrating an example of processing according to the first exemplary embodiment. The CPU 10 performs the processing of the flowchart by executing a program stored in the ROM 15 or the HDD 14. The processing illustrated in FIG. 15 corresponds to processing performed by the MFP 100 side when a user issues a setting change instruction in the MFP 100.

In step S1501, the CPU 10 determines whether a setting change instruction has been given by the user. In a case where the CPU 10 determines that there is no setting change instruction (NO in step S1501), the operation of the flowchart ends. On the other hand, in a case where the CPU 10 determines that the setting change instruction has been given (YES in step S1501), the operation proceeds to step S1502.

In step S1502, the CPU 10 compares a value that is set in the MFP 100 before the setting change instruction is issued and a value that is set according to the setting change instruction.

In step S1503, the CPU 10 determines whether there is a difference between the values compared in step S1502.

In a case where the CPU 10 determines that there is no difference (NO in step S1503), the operation proceeds to step S1504. In step S1504, the CPU 10 sets a setting change flag to "0" which is a value to be stored in the hard disk drive 14. Then, the operation of the flowchart ends.

On the other hand, in a case where the CPU 10 determines that there is a difference (YES in step S1503), the operation proceeds to step S1505. In step S1505, the CPU 10 determines whether a reboot of the MFP 100 is necessary to reflect the setting having the difference.

In a case where the CPU 10 determines that a reboot of the MFP 100 is not necessary to reflect the setting (NO in step S1505), the operation proceeds to step S1506. In step S1506, the CPU 10 sets the setting change flag to "1" which is a value to be stored in the HDD 14. Then, the operation of the flowchart ends.

On the other hand, in a case where the CPU 10 determines that a reboot of the MFP 100 is necessary to reflect the setting (YES in step S1505), the operation proceeds to step S1507. In step S1507, the CPU 10 sets the setting change flag to "2" which is a value to be stored in the HDD 14. Then, the operation of the flowchart ends.

Figure 3:
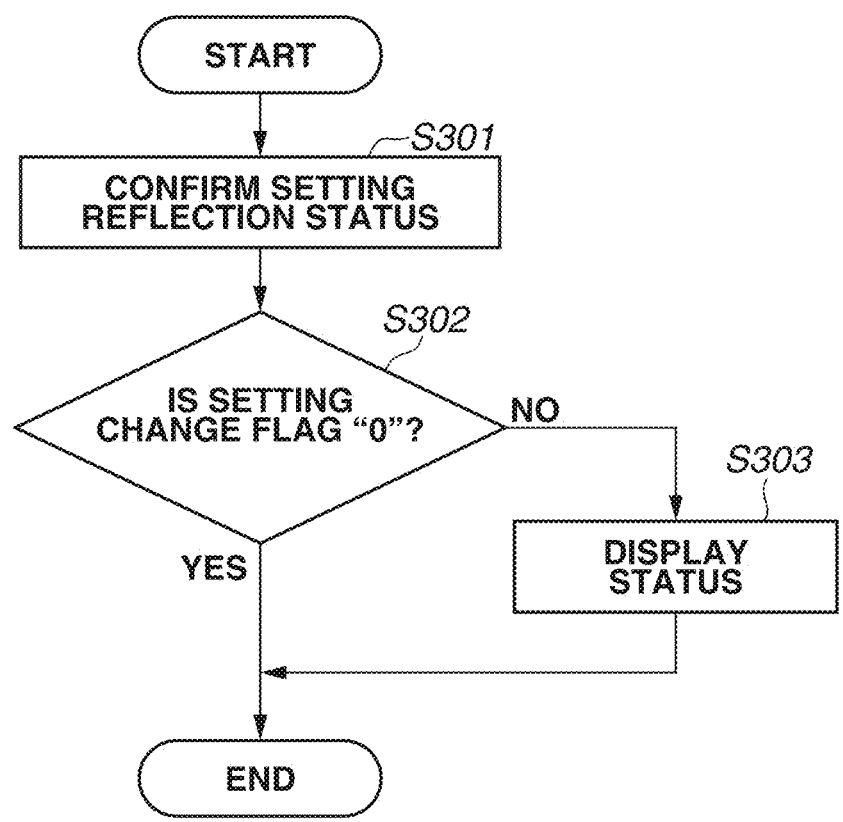
FIG. 3 is a flowchart illustrating an example of processing according to a first exemplary embodiment.

FIG. 3 is a flowchart illustrating an example of processing according to the first exemplary embodiment. The CPU 10 performs the processing of the flowchart by executing a program stored in the ROM 15 or the HDD 14. The processing of the flowchart illustrated in FIG. 3 corresponds to processing performed to notify the user of presence of an unreflected item. Such a case occurs when there is an unreflected item after the setting of the MFP 100 is changed. The processing illustrated in FIG. 3 is repeatedly executed. Alternatively, the processing illustrated FIG. 3 may be repeatedly executed only when any of users is logged in to the MFP 100.

Figure 4A:
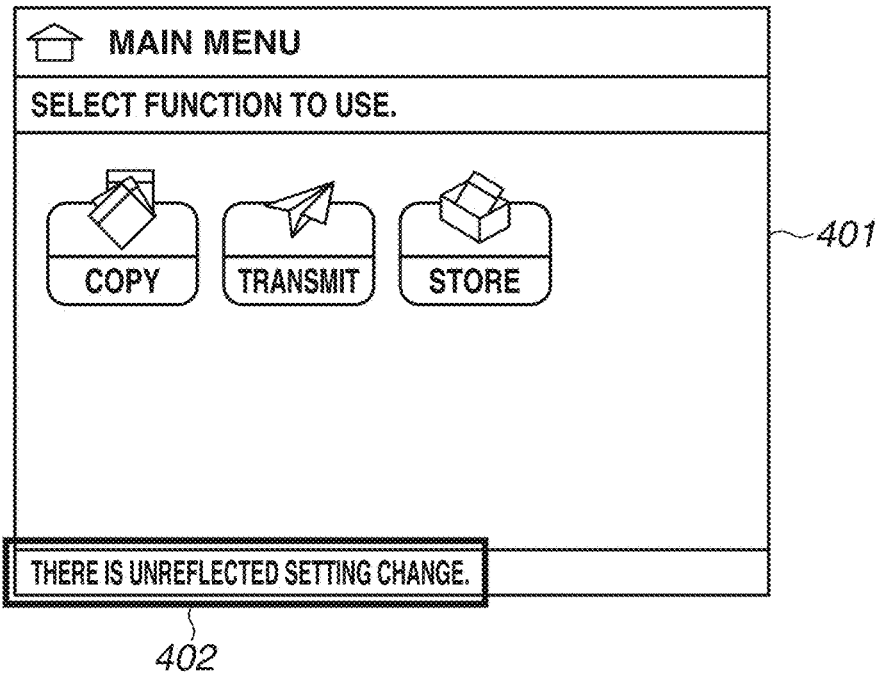
FIGS. 4A and 4B are diagrams each illustrating an example of an operation screen displayed on the operation unit according to the first exemplary embodiment.
Figure 4B:
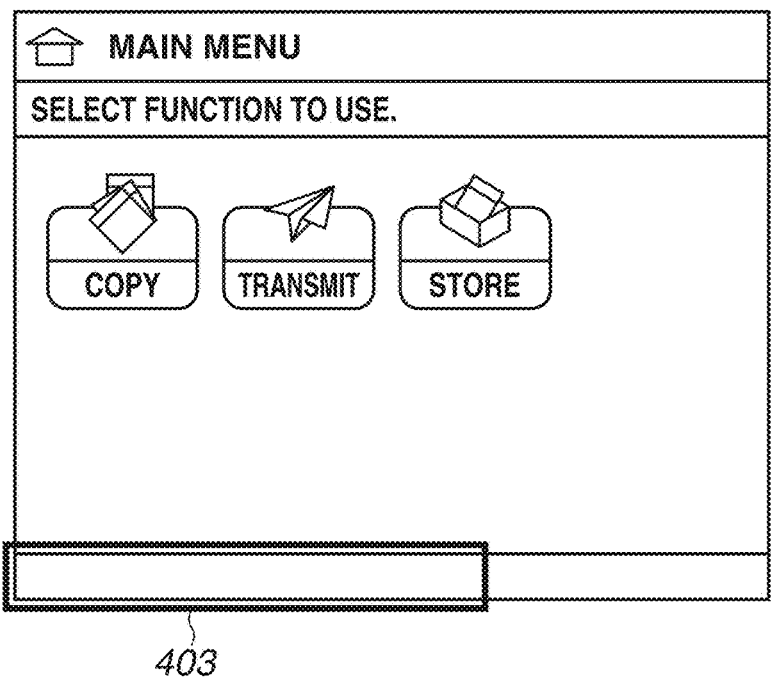

FIGS. 4A and 4B are diagrams each illustrating an example of an operation screen displayed on the display unit 21 of the operation unit 20 according to the first exemplary embodiment.

In step S301, the CPU 10 obtains a value of the setting change flag stored in the HDD 14 to perform a setting reflection status confirmation.

In step S302, the CPU 10 determines, based on a result of the confirmation performed in step S301, whether the value of the setting change flag is "0".

In a case where the value of the setting change flag is "0" (YES in step S302), the CPU 10 determines that there is no setting item which has not been reflected to the MFP 100. In such a case, a blank message 403 illustrated in FIG. 4B is displayed in a status display area. Then, the operation of the flowchart ends.

On the other hand, in a case where the CPU 10 determines that the value of the setting change flag is not "0" (NO in step S302), the operation proceeds to step S303. In step S303, the CPU 10 displays a message 402 illustrated in FIG. 4A indicating presence of a setting item that has not been reflected to the MFP 100 in the status display area on the display unit 21. Then, the operation of the flowchart ends.

In step S303 as described above, the CPU 10 displays the same message regardless of whether a value of the setting change flag is "1" or "2". Alternatively, a message may be changed depending on whether a value of the setting change flag is "1" or "2". For example, in a case where a value of the setting change flag is "1", the CPU 10 may display a message such as "there is an unreflected setting change." In a case where a value of the setting change flag is "2", the CPU 10 may display a message such as "there is an unreflected setting change. Reboot is necessary for reflection."

According to the first exemplary embodiment, therefore, in a case where a setting changed by a user has not been reflected yet, the user can determine (recognize) the presence of the unreflected setting change. This can prevent the user from leaving the setting change unreflected.

Figure 5:
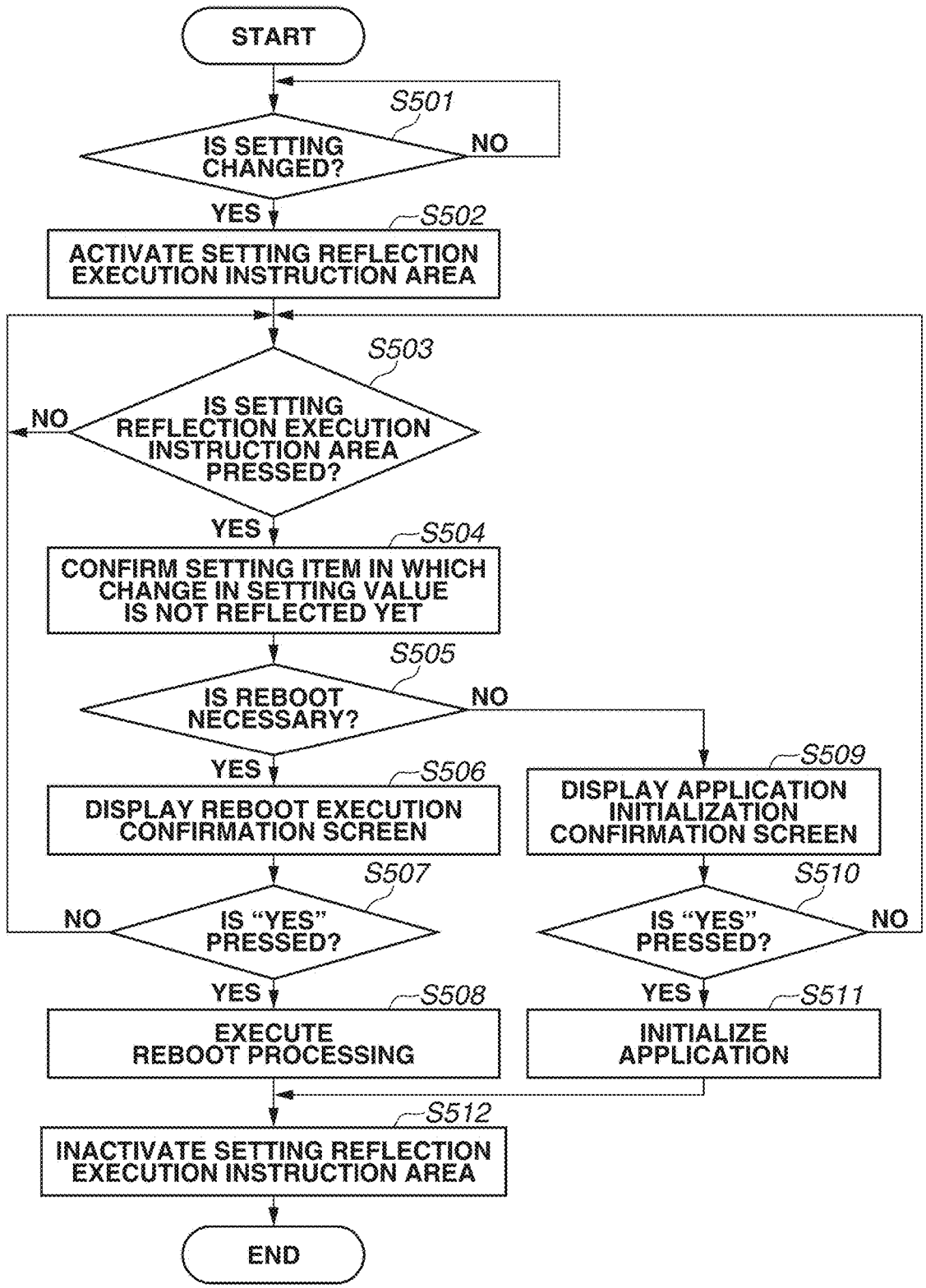
FIG. 5 is a flowchart illustrating an example of processing according to a second exemplary embodiment.

Operations of an MFP 100 according to a second exemplary embodiment of the present invention are described below with reference to FIGS. 5 and 6. FIG. 5 is a flowchart illustrating an example of processing according to the second exemplary embodiment. A CPU 10 performs the processing of the flowchart by executing a program stored in a ROM 15 or an HDD 14. The processing of the flowchart illustrated in FIG. 5 corresponds to processing performed before a setting change is reflected when the setting of the MFP 100 is changed.

Figure 6:
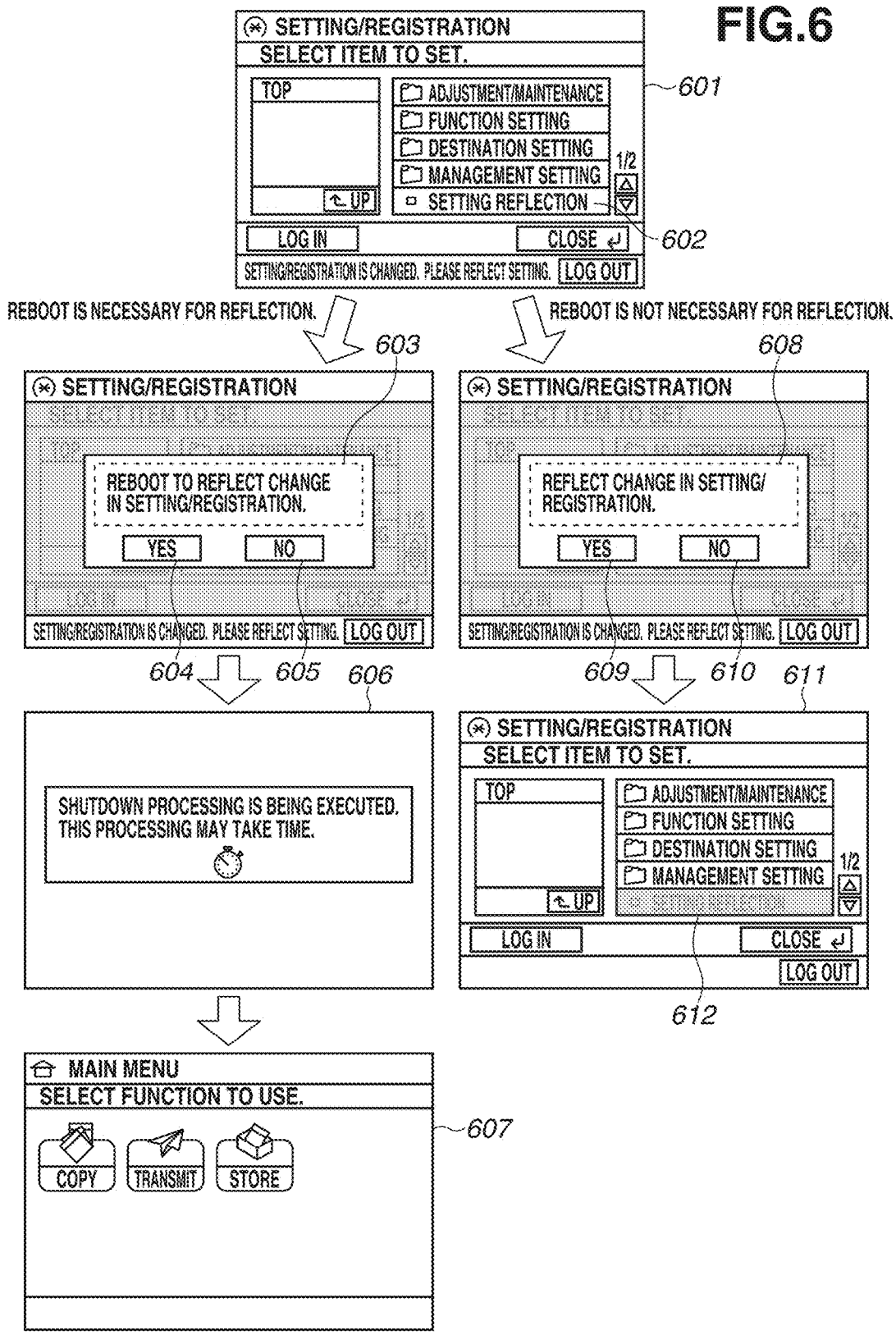
FIG. 6 is a diagram illustrating an example of an operation screen displayed on an operation unit according to the second exemplary embodiment.

FIG. 6 is a diagram illustrating an example of an operation screen displayed on a display unit 21 of an operation unit 20 according to the second exemplary embodiment.

A screen (setting change screen) 601 illustrated in FIG. 6 is a screen used for changing a setting of the MFP 100.

In step S501, the CPU 10 determines whether a setting has been changed using the setting change screen 601. In case where the CPU 10 determines that the setting is not changed (NO in step S501), the CPU 10 repeats the processing of step S501. The determination procedure in step S501 is, for example, similar to that performed in step S1501 through step S1503 illustrated in FIG. 15.

On the other hand, in a case where the CPU 10 determines that the setting has been changed (YES in step S501), the operation proceeds to step S502. In step S502, the CPU 10 activates (enables) a setting reflection execution instruction area 602. This allows the setting reflection execution instruction area 602 to receive an operation from the user.

In step S503, the CPU 10 determines whether the setting reflection execution instruction area 602 is pressed (whether a setting reflection execution instruction is issued). In a case where the CPU 10 determines that the setting reflection execution instruction area 602 is not pressed (the setting reflection execution instruction is not issued) (NO in step S503), the CPU 10 repeats the processing of step S503.

On the other hand, in a case where the CPU 10 determines that the setting reflection execution instruction area 602 is pressed (the setting reflection execution instruction is issued) (YES in step S503), the operation proceeds to step S504. In step S504, the CPU 10 confirms a setting item in which a change in a setting value has not yet been reflected to the MFP 100 although the setting value is changed.

In step S505, the CPU 10 determines, based on a result of the confirmation performed in step S504, whether a reboot of the MFP 100 is necessary to reflect the setting change. In case where the CPU 10 determines that the reboot of the MFP 100 is necessary (YES in step S505), the operation proceeds to step S506. In step S506, the CPU 10 displays a reboot execution confirmation screen 603 on the display unit 21 so that the user can confirm whether the MFP 100 should reboot. Then, the operation proceeds to step S507. The reboot execution confirmation screen 603 includes a "YES" button 604 and a "NO" button 605 for allowing the user to select whether to instruct the MFP 100 to reboot.

In step S507, the CPU 10 determines whether the reboot execution is instructed on the reboot execution confirmation screen 603 (whether the "YES" button 604 is pressed). In a case where the CPU 10 determines that the reboot execution is not instructed (the "NO" button 605 is pressed) (NO in step S507), the operation returns to step S503.

On the other hand, in a case where the CPU 10 determines that the reboot execution is instructed (the "YES" button 604 is pressed) (YES in step S507), the operation proceeds to step S508. In step S508, the CPU 10 displays a reboot execution screen 606 and executes reboot processing. After execution of the reboot processing, the operation proceeds to step S512 in which the CPU 10 inactivates the setting reflection execution instruction area 602. This causes the setting reflection execution instruction area 602 not to allow reception of an operation from the user. Then, the operation of the flowchart ends.

In step S505, in a case where the CPU 10 determines that the reboot of the MFP 100 is not necessary (NO in step S505), the operation proceeds to step S509 in which the CPU 10 displays an application initialization confirmation screen 608 on the display unit 21. Then, the operation proceeds to step S510. The application initialization confirmation screen 608 includes a "YES" button 609 and a "NO" button 610 so that the user can select whether to instruct the CPU 10 to initialize an application relating to the unreflected setting change.

In step S510, the CPU 10 determines whether the application initialization execution is instructed using the application initialization confirmation screen 608 (whether the "YES" button 609 is pressed). In a case where the CPU 10 determines that the application initialization execution is not instructed (the "NO" button 610 is pressed) (NO in step S510), the operation returns to step S503.

On the other hand, in a case where the CPU 10 determines that the application initialization execution is instructed (the "YES" button 609 is pressed) (YES in step S510), the operation proceeds to step S511. In step S511, the CPU 10 initializes the application. After initialization of the application, in step S512, the CPU 10 inactivates the setting reflection execution instruction area 602. This causes the setting reflection execution instruction area 602 not to allow reception of an operation from the user. Then, the operation of the flowchart ends.

As described above, according to the second exemplary embodiment, in a case where a setting changed by a user has not been reflected yet, the user can determine (recognize) the presence of the unreflected setting change and whether a reboot of the MFP 100 is necessary to reflect the unreflected setting change. Moreover, the user can instruct the MFP 100 to reboot or to initialize an application, so that the setting is reflected. This can prevent the user from leaving the setting change unreflected.

Figure 7:
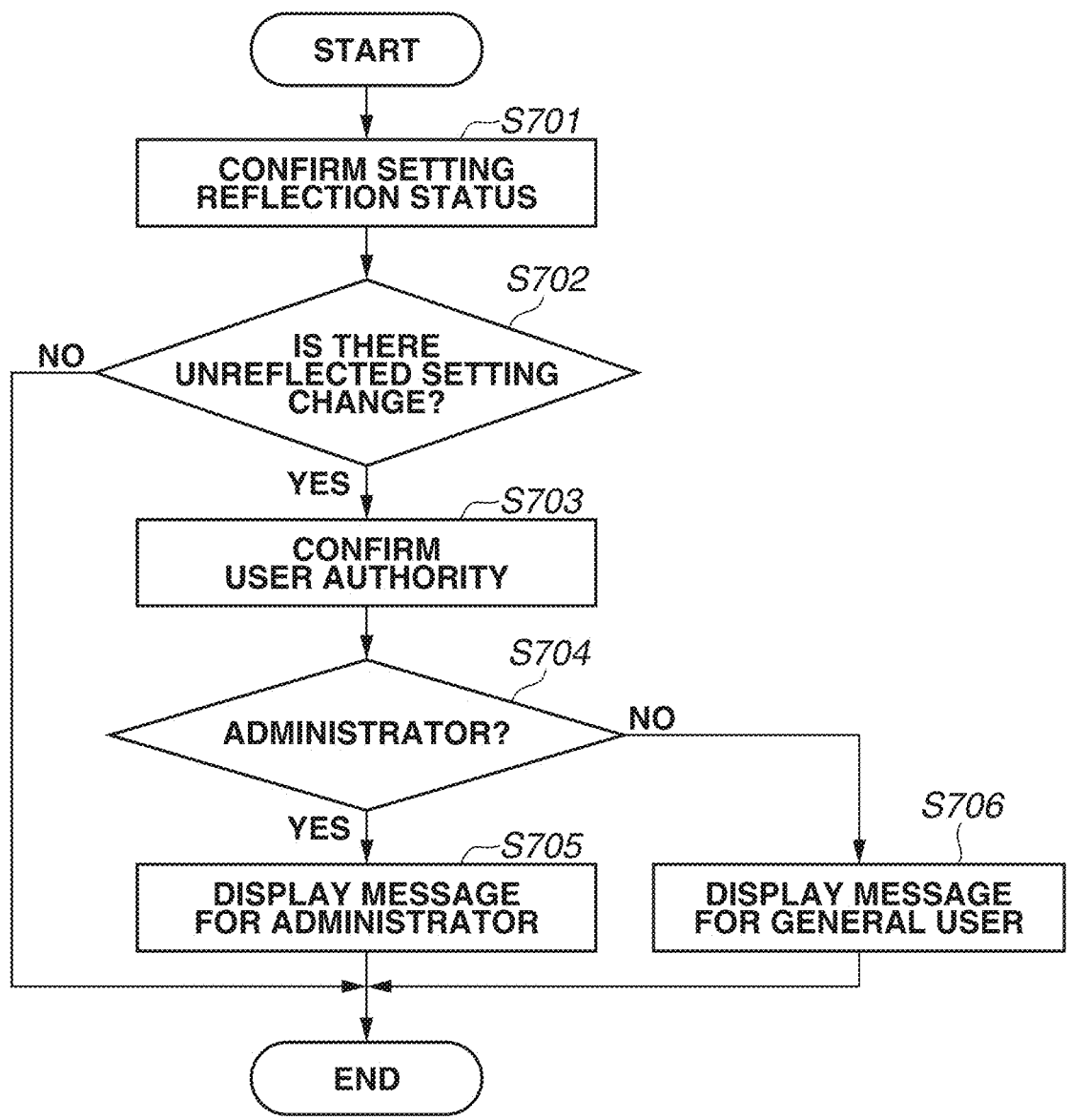
FIG. 7 is a flowchart illustrating an example of processing according to a third exemplary embodiment.

Operations of an MFP 100 according to a third exemplary embodiment of the present invention are described below with reference to FIGS. 7, 8A, and 8B. FIG. 7 is a flowchart illustrating an example of processing according to the third exemplary embodiment. A CPU 10 performs the processing of the flowchart by executing a program stored in a ROM 15 or an HDD 14. This processing corresponds to processing performed when a message to be displayed in a status display area is changed according to login user authority.

FIGS. 8A and 8B are diagrams each illustrating an example of an operation screen displayed on a display unit 21 of an operation unit 20 according to the third exemplary embodiment.

An operation screen 801 illustrated in FIG. 8A is displayed for a general user, whereas an operation screen 802 illustrated in FIG. 8B is displayed for an administrator.

In step S701, the CPU 10 confirms a setting reflection status. For example, as similar to step S301 illustrated in FIG. 3, the CPU 10 confirms the stetting reflection status based on a setting change flag value stored in the HDD 14. Then, in step S702, the CPU 10 determines whether there is an unreflected setting change based on a result of the confirmation performed in step S701.

In a case where there is no unreflected setting change (NO in step S702), the CPU 10 determines that there is no setting item that has not yet been reflected to the MFP 100. Accordingly, the CPU 10 does not display a message in a status display area, and the operation of the flowchart ends.

On the other hand, in a case where the CPU 10 determines that there is an unreflected setting change (YES in step S702), the operation proceeds to step S703. In step S703, the CPU 10 confirms authority of a currently logged-in user.

In step S704, the CPU 10 determines whether the authority of the currently logged-in user confirmed in step S703 is administrator authority. In a case where the CPU determines that the currently logged-in user has the administrator authority (YES in step S704), the operation proceeds to step S705. In step S705, the CPU 10 displays a message 803 for an administrator, as illustrated in FIG. 8B, in a status display area on the display unit 21. Then, the operation of the flowchart ends.

On the other hand, in a case where the CPU 10 determines that the currently logged-in user does not have the administrator authority (i.e., the currently logged-in user has general user authority) (NO in step S704), the operation proceeds to step S706. In step S706, the CPU 10 displays a message 803 for a general user, as illustrated in FIG. 8A, in the status display area on the display unit 21. Then, the operation of the flowchart ends.

A user having the administrator authority can change all of setting items of the MFP 100, whereas changing of setting items of the MFP 100 is restricted for a user having the general user authority.

According to the present exemplary embodiment, the message for an administrator includes "There is an unreflected setting change. Please reflect the setting change." The message for a general user includes "There is an unreflected setting change. Please contact an administrator."

According to the third exemplary embodiment, in a case where a setting changed by a user has not been reflected yet, the user can determine (recognize) the presence of the unreflected setting change. In addition, a message can be switched according to the authority of the currently logged-in user. This can prevent the administrator from leaving the setting change unreflected, and can prompt the general user to contact the administrator.

Operations of an MFP 100 according to a fourth exemplary embodiment of the present invention are described below with reference to FIGS. 9, 10A, and 10B.

Figure 9:
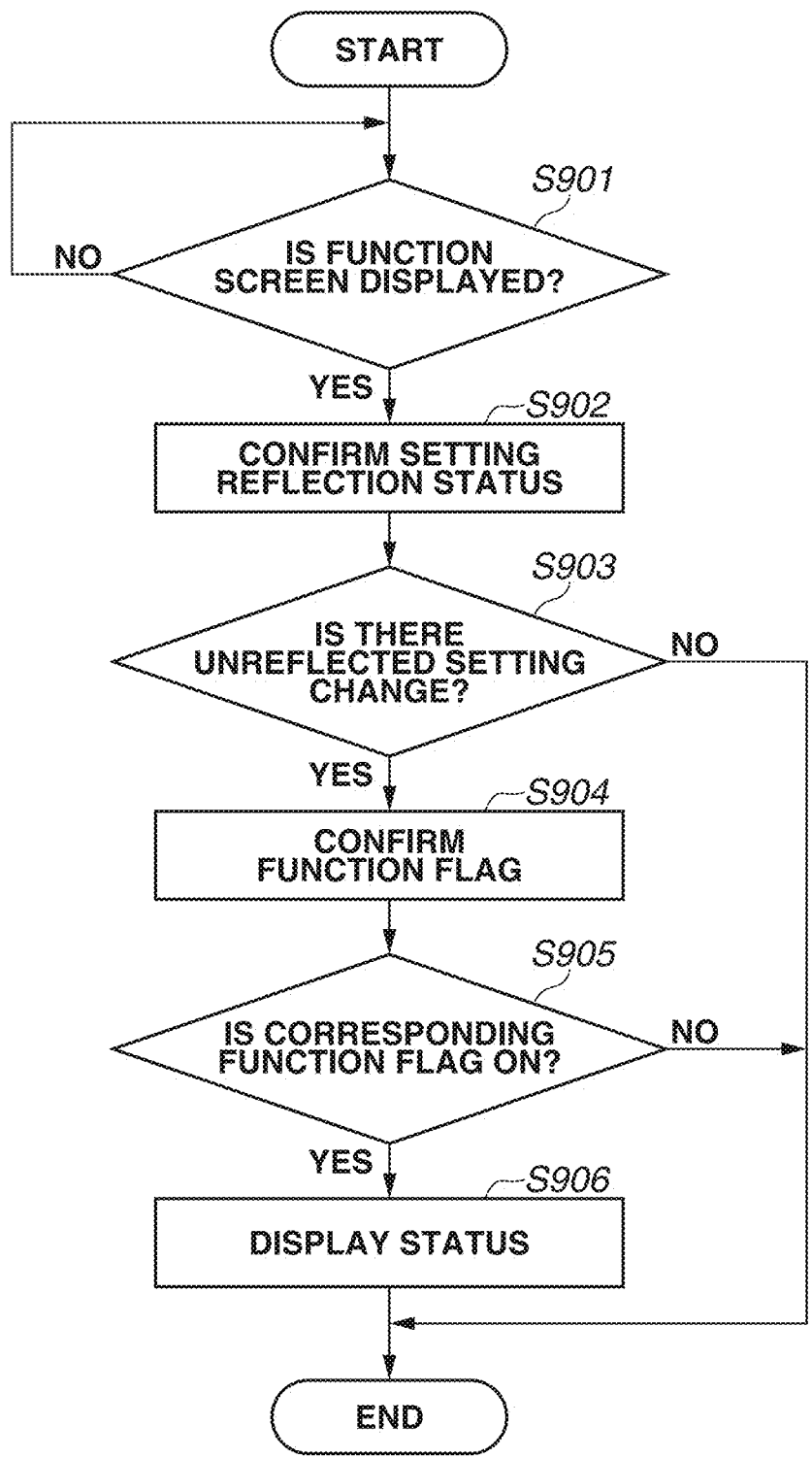
FIG. 9 is a flowchart illustrating an example of processing according to a fourth exemplary embodiment.

FIG. 9 is a flowchart illustrating an example of processing according to the fourth exemplary embodiment. A CPU 10 performs the processing of the flowchart by executing a program stored in a ROM 15 or an HDD 14. A setting change in a setting item relating to a function of the MFP 100 may have not been reflected to the MFP 100. In such a case, when a user opens an operation screen of the corresponding function, a message is displayed in a status display area. Such processing corresponds to the processing illustrated in FIG. 9.

Figures 10A, 10B:
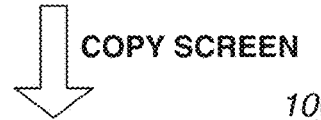
FIGS. 10A and 10B are diagrams each illustrating an example of an operation screen displayed on an operation unit according to the fourth exemplary embodiment.

FIGS. 10A and 10B are diagrams each illustrating an example of an operation screen displayed on a display unit 21 of an operation unit 20 according to the fourth exemplary embodiment.

An operation screen 1002 illustrated in FIG. 10A is a copy screen used to execute a copy operation by the MFP 100. An operation screen 1004 illustrated in FIG. 10B is a box screen used to execute a box function for storing image data in the HDD 14 or printing the stored image data. An operation screen 1001 illustrated in FIG. 10A is a setting screen for a box function in the MFP 100, and is used to change a setting for the box function.

In addition to the copy function and the box function as described above, the MFP 100 includes a transmission function for transmitting image data to a designated destination. The MFP 100 further includes a setting screen (e.g., the screen 1001) used to set settings for each of these functions. The MFP 100 retains function flag information. When a user changes a setting of each function, a corresponding flag is set to ON. Such function flag information is stored in the HDD 14. For example, when a setting for the box function is changed on the setting screen 1001, the CPU 10 sets "BOX" in a function flag 1006 to ON as illustrated in FIG. 10B.

In step S901, the CPU 10 determines whether a screen for operating a function is displayed by the user. If the CPU 10 determines that the screen for operating the function is not displayed by the user (NO in step S901), the CPU 10 repeats the operation of step S901.

On the other hand, in a case where the CPU 10 determines that the screen for operating the function is displayed by the user (YES in step S901), the operation proceeds to step S902. In step S902, the CPU 10 performs a setting reflection status confirmation. The setting reflection status confirmation is that after the user changes a setting of the MFP 100, the CPU 10 confirms whether the setting changed by the user is reflected. For example, as similar to step S301 illustrated in FIG. 3, the CPU 10 performs the stetting reflection status confirmation based on a setting change flag value stored in the HDD 14.

In step S903, the CPU 10 determines whether there is an unreflected setting change based on a result of the confirmation performed in step S902. In a case where there is no unreflected setting change (NO in step S903), the CPU 10 determines that there is no setting item that has not yet been reflected to the MFP 100. Accordingly, the CPU 10 does not display a message in a status display area, and the operation of the flowchart ends.

On the other hand, in a case where the CPU 10 determines that there is an unreflected setting change (YES in step S903), the operation proceeds to step S904. In step S904, the CPU 10 confirms the function flag 1006 stored in the HDD 14.

In step S905, the CPU 10 determines, based on a result of the confirmation performed in step S904, whether a function flag corresponding to the function of the screen currently displayed by the user is ON. In a case where the CPU 10 determines that the function flag corresponding to the function of the screen currently displayed by the user is not ON (NO in step S905), the CPU 10 does not display a new message about the unreflected setting change in a status display area on the display unit 21 while a message 1003 illustrated in FIG. 10A remains displayed. Then, the operation of the flowchart ends.

On the other hand, in a case where the CPU 10 determines that the function flag corresponding to the function of the screen currently displayed by the user is ON (YES in step S905), the operation proceeds to step S906. In step S906, the CPU 10 displays a message 1005 in the status display area on the display unit 21. The message 1005 indicates that there is an unreflected setting change. Then, the operation of the flowchart ends.

For example, when the user changes a setting on the setting screen 1001 for the box function, "BOX" in the function flag 1006 is set to ON as illustrated in FIG. 10B. When the user opens the copy screen 1002, the CPU 10 does not display any message with the message 1003 in the status display area since "COPY" in the function flag 1006 is OFF. On the other hand, when the user opens the box screen 1004, the CPU 10 displays the message 1005 in the status display area since "BOX" in the function flag 1006 is ON.

According to the fourth exemplary embodiment as described above, in a case where a setting changed by a user has not been reflected yet, a user who intends to use a function of which setting has been changed can determine (recognize) the presence of such an unreflected setting change. This can prevent the user from using the function without executing reflection of the setting change.

Operations of an MFP 100 according to a fifth exemplary embodiment of the present invention are described below with reference to FIGS. 11 and 12.

Figure 11:
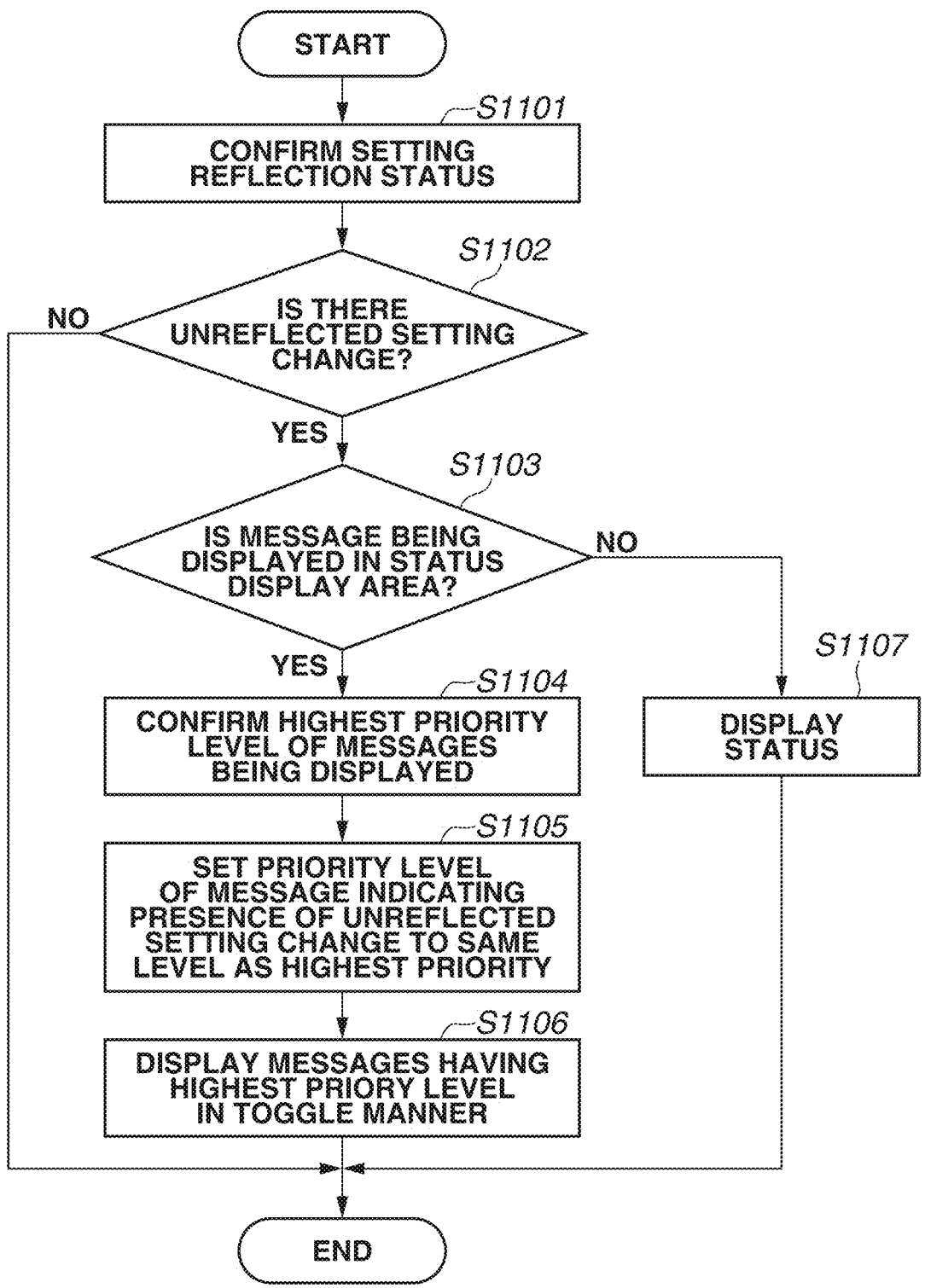
FIG. 11 is a flowchart illustrating an example of processing according to a fifth exemplary embodiment.

FIG. 11 is a flowchart illustrating an example of processing according to the fifth exemplary embodiment. A CPU 10 performs the processing of the flowchart by executing a program stored in a ROM 15 or an HDD 14. The processing illustrated in FIG. 11 corresponds to processing performed for a case where a message indicating the presence of an unreflected setting change in the MFP 100 is displayed in a status display area while a message is already displayed in the status display area.

Figure 12:
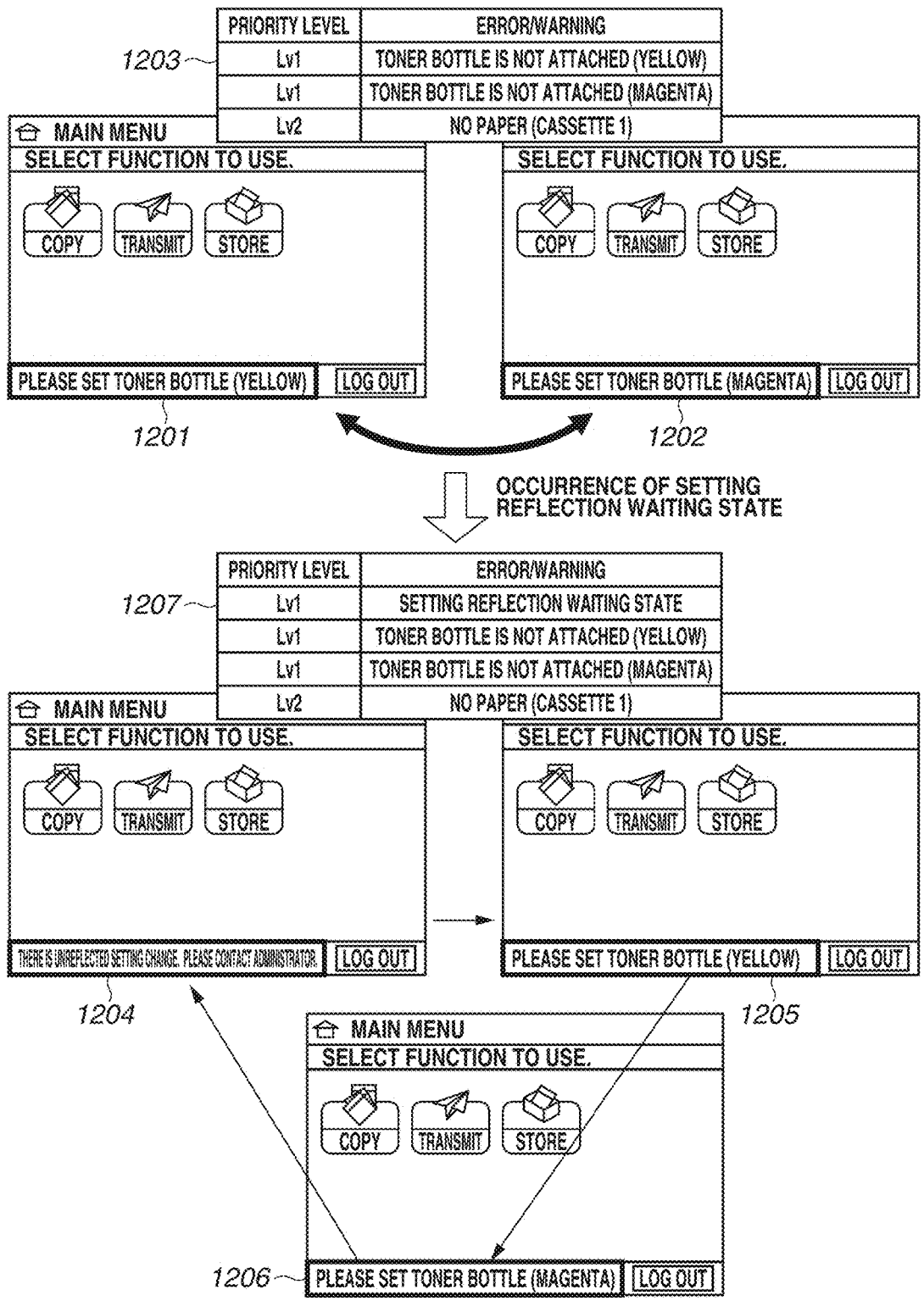
FIG. 12 is a diagram illustrating an example of an operation screen displayed on an operation unit according to the fifth exemplary embodiment.

FIG. 12 is a diagram illustrating an example of an operation screen displayed on a display unit 21 of an operation unit 20 according to the fifth exemplary embodiment.

Each of messages 1201 and 1202 illustrated in FIG. 12 is displayed in a status display area as a status of the MFP 100 in a case where any of states illustrated in an example table 1203 occurs. In a case where a plurality of states occur in the MFP 100, a message for a state having the highest priority level among the plurality of states occurring at a point of time is displayed. In a case where a plurality of states each having the highest priority level occurs at the period of time, messages for the plurality of states having the highest priority level are displayed in the status display area in a toggle manner (displayed in rotation).

As illustrated in the table 1203 of FIG. 12, a state "toner bottle is not attached (Yellow)" and a state "toner bottle is not attached (Magenta)" are each set to a priority level of "Lv1", whereas a state "no paper (cassette 1)" is set to a priority level of "Lv 2". Accordingly, as illustrated in FIG. 12, the messages 1201 and 1202 for the respective states "toner bottle is not attached (Yellow) and "toner bottle is not attached (Magenta)" are displayed while being sequentially switched (displayed in rotation).

In step S1101, the CPU 10 performs a confirmation of a setting reflection status. For example, as similar to step S301 illustrated in FIG. 3, the CPU 10 performs the stetting reflection status confirmation based on a setting change flag value stored in the HDD 14. In step S1102, the CPU 10 determines whether there is an unreflected setting change based on a result of the conformation performed in step S1101.

In a case where there is no unreflected setting change (NO in step S1102), the CPU 10 determines that there is no setting item that has not yet been reflected to the MFP 100. Accordingly, the CPU 10 does not display a message in a status display area, and the operation of the flowchart ends.

On the other hand, in case where the CPU 10 determines that there is an unreflected setting change (YES in step S1102), the operation proceeds to step S1103. In step S1103, the CPU 10 determines whether there is a message being displayed in a status display area at the point of time.

In a case where the CPU 10 determines that there is no message being displayed in the status display area at the point of time (NO in step S1103), the operation proceeds to step S1107. In step S1107, the CPU 10 displays a message indicating that "there is an unreflected setting change in the device" in the status display area on the display unit 21. Then, the operation of the flowchart ends.

On the other hand, in a case where the CPU 10 determines that there is a message being displayed in the status display area at the point of time (YES in step S1103), the operation proceeds to step S1104. In step S1104, the CPU 10 confirms the highest priority level of the massage being currently displayed in the status display area.

In step S1105, the CPU 10 sets a priority level of the message indicating that "there is an unreflected setting change in the device" to the same level as the highest priority level confirmed in step S1104, as illustrated in a table 1207 of FIG. 12.

In step S1106, the CPU 10 displays messages 1204, 1205, and 1206, each of which has the highest priority level, in the status display area on the display unit 21 in a toggle manner (displays in rotation). Then, the operation of the flowchart ends.

For example, a state "there is an unreflected setting change in the device" (a setting reflection waiting state) may occur. In such a case, in a case where a state occurring in the MFP 100 has a priority level of "Lv1", the CPU 10 sets a priority level of the setting reflection waiting state to "Lv1". In a case where a setting reflection waiting state occurs, and a state occurring in the MFP 100 may have a priority level of "Lv2", the CPU 10 sets a priority level of the setting reflection waiting state to "Lv2". This enables a message indicating the setting reflection waiting state to be displayed in the status display area without being hidden by other messages having the high priority level.

Before a setting relating to a setting reflection waiting state to which a priority level is set is reflected, a state having a higher priority level than the priority level set to the setting reflection waiting state may occur. In such a case, the setting of the priority level of the setting reflection waiting state may be changed to the priority level of the state which has occurred. This enables the message for the setting reflection waiting state to be displayed in the status display area without being hidden by a message having a higher priority level.

According to the fifth exemplary embodiment as described above, in a case where a setting changed by a user has not been reflected yet, a message indicating the presence of the unreflected setting change can be displayed in a status display area without being hidden by other messages having higher priority level. Thus, the user can determine (recognize) the message indicating that the setting change has not been reflected yet, together with the other messages having higher priory level. This prevents the user from leaving the setting change unreflected.

Operations of an MFP 100 according to a sixth exemplary embodiment of the present invention are described below with reference to FIGS. 13, 14A, 14B, and 14C.

Figure 13:
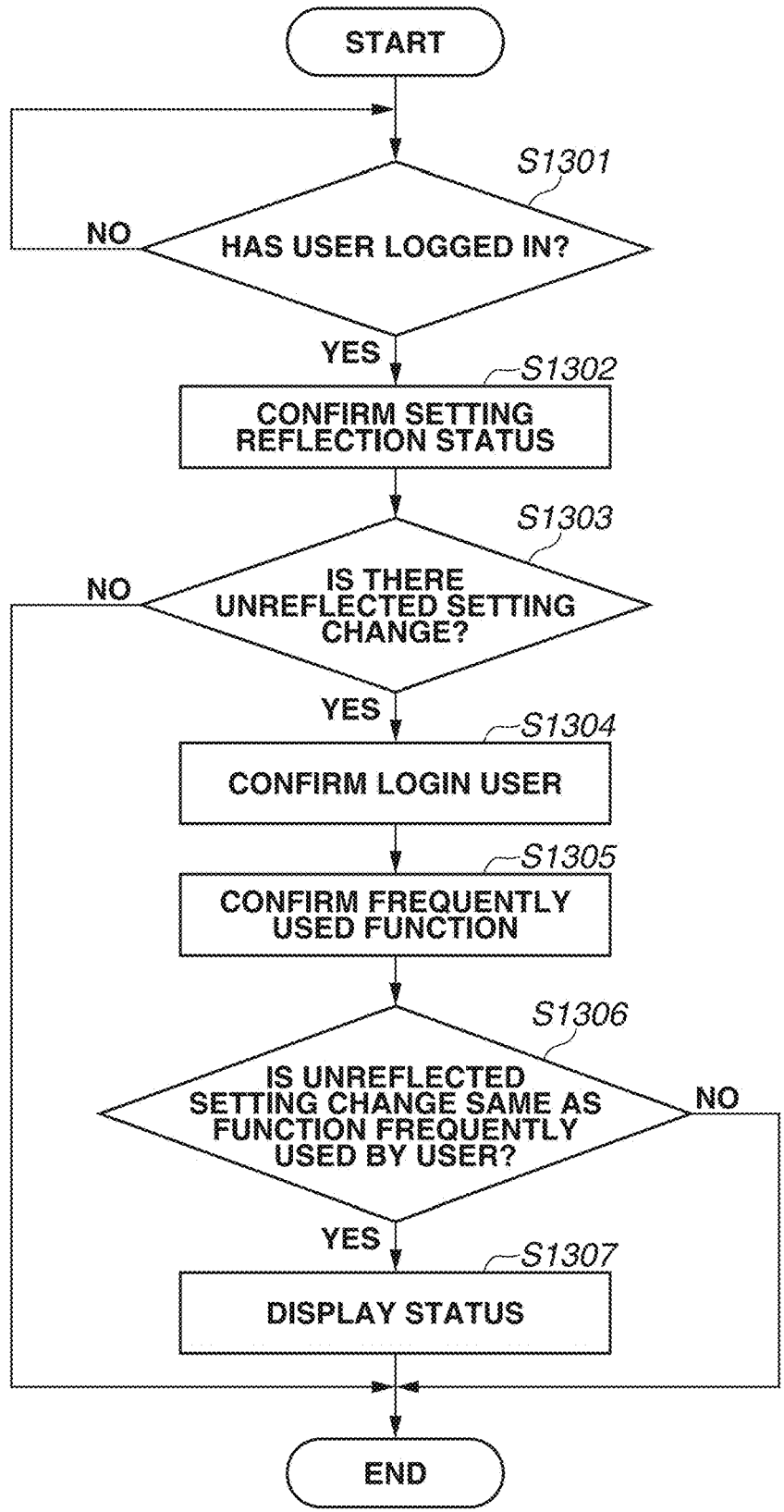
FIG. 13 is a flowchart illustrating an example of processing according to a sixth exemplary embodiment.

FIG. 13 is a flowchart illustrating an example of processing according to the sixth exemplary embodiment. A CPU 10 performs the processing of the flowchart by executing a program stored in a ROM 15 or an HDD 14. The processing of the flowchart illustrated in FIG. 13 corresponds to processing performed to display a message in a status display area only when there is an unreflected setting change for a function that is frequently used by a user.

Figure 14A:
Figure 14B:
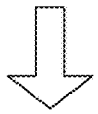

FIGS. 14A, 14B, and 14C are diagrams each illustrating an example of an operation screen displayed on a display unit 21 of an operation unit 20 according to the sixth exemplary embodiment.

According to the sixth exemplary embodiment, the MFP 100 retains information 1402 illustrated in FIG. 14A indicating a relationship between a user and a function frequently used by the user on a user basis. The information 1402 is stored in the HDD 14. For example, functions frequently used by "user A", "user B", and "user C" are "box function", "copy function" and "transmission function", respectively. In such a case, as illustrated in the information 1402, "user A", "user B", and "user C" are respectively associated with "box function", "copy function", and "transmission function" with each other.

In step S1301, the CPU 10 determines whether a user has logged in. In a case where the CPU 10 determines that a user has not logged in (NO in step S1301), the CPU 10 repeats the processing of step S1301. On the other hand, in a case where the CPU 10 determines that a user has logged in (YES in step S1301), the operation proceeds to step S1302.

In step S1302, the CPU 10 performs a setting reflection status confirmation. For example, as similar to step S301 illustrated in FIG. 3, the CPU 10 performs the stetting reflection status confirmation based on a setting change flag value stored in the HDD 14. In step S1303, the CPU 10 determines whether there is an unreflected setting change based on a result of the confirmation performed in step S1302.

In a case where there is no unreflected setting change (NO in step S1303), the CPU 10 determines that there is no setting item that has not yet been reflected to the MFP 100. Accordingly, the CPU 10 does not display a message in a status display area, and the operation of the flowchart ends.

On the other hand, in a case where the CPU 10 determines that there is an unreflected setting change (YES in step S1303), the operation proceeds to step S1304. In step S1304, the CPU 10 confirms the login user. In step S1305, the CPU 10 confirms a function frequently used by the login user checked in step S1304 based on the information 1402 stored in the HDD 14.

In step S1306, the CPU 10 determines whether a function relating to the unreflected setting change confirmed in step S1302 is substantially the same as the function confirmed in step S1305. In a case where the CPU 10 determines that the function is different (NO in step S1306), a message is not displayed in a status display area. That is, for example, a blank message 1410 illustrated in FIG. 14A is displayed in a status display area. Then, the operation of the flowchart ends.

On the other hand, in a case where the CPU 10 determines that the function is substantially the same (YES in step S1306), the operation proceeds to step S1307. In step S1307, the CPU 10 displays a message 1408 illustrated in FIG. 14B in the status display area on the display unit 21. The message 1408 indicates that there is an unreflected setting change. Then, the operation of the flowchart ends.

For example, the "user A" frequently uses the "box function". When the "user A" logs in, and in a case where there is an unreflected setting change relating to the "box function", the CPU 10 displays the message 1408, which indicates the presence of the unreflected setting change, in the status display area on the display unit 21. When the "user A" logs in, and in a case where there is an unreflected setting change relating to the "transmission function", the CPU 10 does not display a message indicating the presence of the unreflected setting change in the status display area on the display unit 21, and the blank message 1410 illustrated in FIG. 14C is displayed in the status display area.

According to the sixth exemplary embodiment as described above, when a user logs in, a state of a function frequently used by the user can be displayed in a status display area in a case where a setting change for the frequently used function has not been reflected yet. This enables the user to determine (recognize) that the setting change for the frequently used function has not been reflected yet, thereby preventing the user from using the function without executing reflection of the setting change.

According to the exemplary embodiments, in a case where a setting changed by a user has not been reflected yet, the user can determine (recognize) the presence of the unreflected setting change. This can prevent the user from leaving a setting change unreflected.

The configuration of various data and the contents thereof described above are not limited thereto, and may be variously provided according to a purpose and a use.

The above exemplary embodiments are described using the MFP. However, the exemplary embodiments of the present invention may be applied to, for example, a system, an apparatus, a method, a program, and a storage medium. Particularly, the exemplary embodiments of the present invention can be applied to a system including a plurality of equipment, or an apparatus including one equipment.

The present invention can also include a combination of each of the above described exemplary embodiments.

Aspects of the present invention can also be achieved by executing the following processing. That is, software (a program) for performing the functions of the above exemplary embodiments is supplied to a system or an apparatus via a network or various storage media, so that the system or a computer (or a device, such as a CPU and a microprocessing unit (MPU)) of the apparatus reads and execute the program.

The present invention can also be applied to a system including a plurality of equipment, or an apparatus including a single equipment.

The present invention is not limited to the exemplary embodiments described above. The scope of the following claims is to be accorded the broadest interpretation so as to encompass all modifications (including an organic combination of each of the exemplary embodiments). That is, the present invention includes each of the above exemplary embodiments and each combination of modifications of such exemplary embodiments.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed:

1. A printing apparatus comprising:
   a display which is able to display a plurality of screens, wherein each of the plurality of screens has a status display area for displaying a status of the printing apparatus;
   a user interface which receives a new setting value of the printing apparatus from a user being logged in to the printing apparatus and receives an instruction for changing a predetermined setting value of the printing apparatus into the new setting value from the user; and
   a controller which reboots the printing apparatus to change the predetermined setting value into the new setting value in accordance with the instruction,
   wherein, before the user interface receives the instruction after the user interface receives the new setting value, the controller controls the display to display a message indicating that the predetermined setting value is not changed in the status display area,
   wherein, before the user interface receives the instruction after the user interface receives the new setting value, the controller controls the display to display the message in the status display area even if another user different from the user logs in to the printing apparatus.

2. The printing apparatus according to claim 1, wherein the controller controls the display to display the message before the controller reboots the printing apparatus.

3. The printing apparatus according to claim 1, wherein the controller determines whether there is the predetermined setting value that is not changed, and controls the display to display the message in the status display area based on determining that there is the predetermined setting value that is not changed.

4. The printing apparatus according to claim 3, wherein the controller determines whether there is the predetermined setting value that is not changed when the another user different from the user logs in to the printing apparatus.

5. The printing apparatus according to claim 1, wherein the controller changes the message to be displayed in the status display area based on a type of a user being logged in to the printing apparatus.

6. The printing apparatus according to claim 1, wherein the controller controls the display to display an item before the user interface receives the instruction after the user interface receives the new setting value, and reboots the printing apparatus based on selection of the item.

7. The printing apparatus according to claim 1, wherein the plurality of screens includes a menu screen for selecting one function from among a plurality of functions at least including a print function and a scan function.

8. The printing apparatus according to claim 1, further comprising a setting key to display a setting screen for receiving the new setting value of the printing apparatus, wherein the plurality of screens include the setting screen.

* * * * *